United States Patent
Brambilla et al.

(10) Patent No.: US 11,423,152 B2
(45) Date of Patent: Aug. 23, 2022

(54) RANDOMIZED CLOCK CYCLE LENGTHS FOR BOOT SEQUENCES

(71) Applicant: Facebook Technologies, LLC, Menlo Park, CA (US)

(72) Inventors: Marco Brambilla, Campbell, CA (US); Jay Tsao, Kirkland, WA (US); Neeraj Upasani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 399 days.

(21) Appl. No.: 16/539,856

(22) Filed: Aug. 13, 2019

(65) Prior Publication Data

US 2020/0394306 A1 Dec. 17, 2020

Related U.S. Application Data

(60) Provisional application No. 62/860,112, filed on Jun. 11, 2019.

(51) Int. Cl.
| | |
|---|---|
| *G06F 21/57* | (2013.01) |
| *G06F 1/04* | (2006.01) |
| *G06F 7/58* | (2006.01) |
| *G06F 21/75* | (2013.01) |

(52) U.S. Cl.
CPC .............. *G06F 21/575* (2013.01); *G06F 1/04* (2013.01); *G06F 7/582* (2013.01); *G06F 7/588* (2013.01); *G06F 21/75* (2013.01); *G06F 2221/034* (2013.01)

(58) Field of Classification Search
CPC .......... G06F 21/575; G06F 1/04; G06F 7/582; G06F 7/588; G06F 21/75; G06F 2221/034
See application file for complete search history.

(56) References Cited

U.S. PATENT DOCUMENTS

| | | | | |
|---|---|---|---|---|
| 7,640,446 | B1* | 12/2009 | Donovan | G06F 1/3203 713/322 |
| 8,732,527 | B2* | 5/2014 | Tabone | G06F 11/1417 714/36 |
| 10,651,863 | B1* | 5/2020 | Rangachari | G06F 7/588 |
| 2002/0136264 | A1* | 9/2002 | Herleikson | A61B 5/0535 375/130 |
| 2010/0067685 | A1* | 3/2010 | Okita | H04L 9/003 380/28 |
| 2018/0309566 | A1* | 10/2018 | Buch | H04L 9/003 |
| 2019/0080093 | A1* | 3/2019 | Pirvu | G06F 9/4406 |
| 2019/0155743 | A1* | 5/2019 | Loreskar | G06F 12/14 |
| 2020/0226264 | A1* | 7/2020 | Xu | G06F 21/575 |

* cited by examiner

*Primary Examiner* — Zahid Choudhury

(74) *Attorney, Agent, or Firm* — Shumaker & Sieffert, P.A.

(57) ABSTRACT

In general, this disclosure describes techniques for using a random number generator to affect the lengths of clock cycles in a clock waveform that drives the timing of operations performed by processing circuitry. In one example, the processing circuitry includes a central processing unit and a clock generator. The clock generator is configured, upon receiving an indication of a boot command for the processing circuitry, generate a random number using a true random number generator and generate, based at least in part on the random number, an output clock waveform indicating at least a length of a clock cycle for the central processing unit. The central processing unit is configured to execute a boot sequence for at least the processing circuitry using the output clock waveform.

20 Claims, 10 Drawing Sheets

RANDOMIZED CLOCK CYCLE LENGTHS FOR BOOT SEQUENCES

This application claims the benefit of U.S. Provisional Application No. 62/860,112, filed Jun. 11, 2019, the entire content of which is incorporated by reference herein.

TECHNICAL FIELD

This disclosure generally relates to processor clocks and, more specifically, to processor clocks for secure boot sequences.

BACKGROUND

Many computing systems, including those that receive content over networks, incorporate content protection or digital rights management technology that includes data decryption and encryption hardware and software. This encryption protects secure data, which is potentially sensitive, private, and/or right-managed and is stored or used on the system, from unauthorized access and exploitation.

SUMMARY

In general, this disclosure describes techniques for using a random number generator to affect the lengths of clock cycles in a clock waveform that drives the timing of operations performed by processing circuitry. These techniques may be applied to reduce a likelihood of a successful compromise of secure boot sequences being executed by computing systems, including AR/VR computing systems, among other applications to improve the security of computing systems and of encryption operations generally.

For example, a randomized clock generator that generates an output clock waveform may use a random number generator to affect the length of clock cycles within the output clock waveform. The random number generator repeatedly outputs random binary sequences that are applied to a clock waveform to vary the length of clock cycles within the clock waveform to produce the output clock waveform. The randomized clock generator may apply different random binary sequences to one or more clock cycles to cause the one or more clock cycles in the output waveform to vary in length. To apply a random binary sequence, the randomized clock generator may use a programmable clock divider to frequency divide the length of the one or more clock cycles by a value that is based on the random binary sequence.

The random number generator may include a pseudo-random number generator (PRNG). To increase the non-determinism of the random binary sequences, the PRNG may be seeded with seed information from a true random number generator (TRNG). This seeding may occur at the start of each secure boot sequence or periodically, for instance. To further increase the randomness of the output clock waveform from the random clock generator, a ring oscillator may generate the clock waveform that is modified using the random binary sequences. An external oscillator or phase-locked loop (PLL), for example, may alternatively be used to generate the clock waveform.

The output clock waveform generated by the randomized clock generator may be used to frustrate replay attacks or other attacks on a computing system and thereby increase the trustworthiness of the computing system. A replay attack exploits the predictable timing of operations executed by a computing device, such as during a secure boot sequence. By driving the timing of the operations using a clock waveform having randomly-generated cycle lengths, the timing of operations is no longer predictable and this reduces the likelihood that a replay attack will succeed. The output clock waveform as generated herein may also frustrate other types of attacks, such as channel analysis, reset glitching, laser pulsing, and so forth.

In one example of the techniques described herein, an artificial reality system includes a clock generator configured to generate, using one or more random binary sequences generated by a random number generator, an output clock waveform having one or more clock cycles of randomized lengths. The artificial reality system also includes processing logic configured to execute instructions according to the output clock waveform.

In another example of the techniques described herein, a method includes generating, by a processing circuit, using one or more random binary sequences generated by a random number generator, an output clock waveform having one or more clock cycles of randomized lengths. The method also includes executing, by the processing circuit, instructions according to the output clock waveform.

In another example of the techniques described herein, a computing device includes a clock generator configured to generate, using one or more random binary sequences generated by a random number generator, an output clock waveform having one or more clock cycles of randomized lengths. The computing device also includes a secure boot sequence for an operating system of the computing device, the secure boot sequence comprising executable instructions. The computing device further includes processing circuitry configured to execute the instructions according to the output clock waveform.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1A:
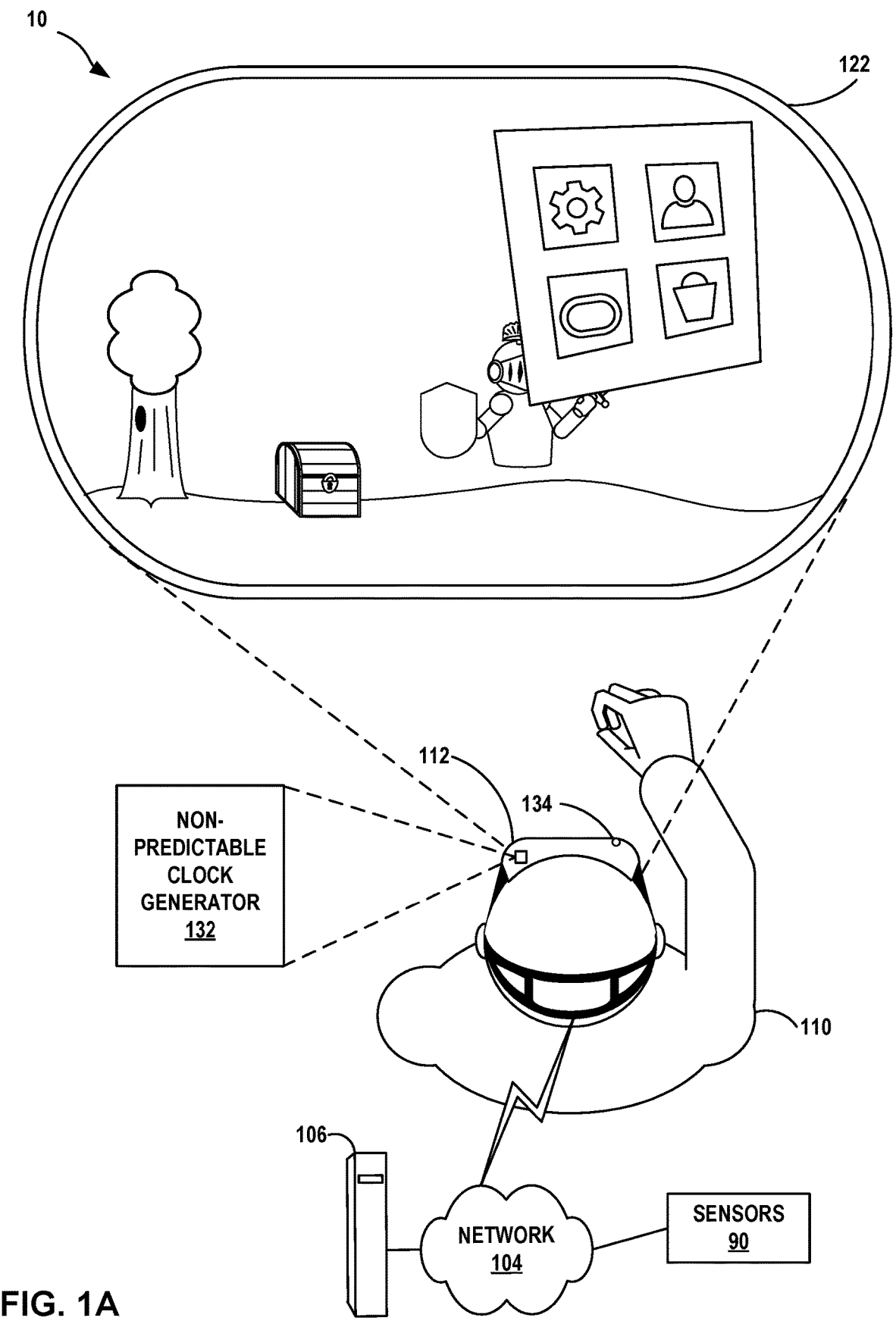
FIG. 1A is an illustration depicting an example artificial reality system that implements a boot sequence with randomized clock cycle lengths in accordance with aspects of this disclosure.

FIG. 1A is an illustration depicting an example artificial reality system 10 that implements a boot sequence with randomized clock cycle lengths in accordance with aspects of this disclosure. In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of HMD 112. HMD 112 may include one or more image capture devices 134, e.g., cameras, line scanners, and the like. Image capture devices 134 may be configured for capturing image data of the surrounding physical environment. In this example, console 106 is shown as a single computing device, such as a gaming console, workstation, a desktop computer, or a laptop.

In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as a WiFi® or 5G® based network, an Ethernet® network, a mesh network or a short-range wireless (e.g., Bluetooth®) communication medium. Although HMD 112 is shown in this example as being in communication with (e.g., tethered to or in wireless communication with) console 106, in some implementations HMD 112 operates as a standalone, mobile artificial reality system. During operation, the artificial reality application constructs artificial reality content 122 for display to user 110 by tracking and computing pose information for a frame of reference, typically a viewing perspective of HMD 112. Artificial reality system 10 may use external sensors 90, external cameras 102, etc. to capture 3D information within the real world, physical environment.

In general, this disclosure describes a secure boot sequence that initializes a secure execution environment for accessing and using secure data by authenticating the required set of software components so as to prevent malicious code from being loaded and executed. Some examples of these computing systems include artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images).

In accordance with the techniques described herein, non-predictable clock generator 132 generates a processor clock having randomized clock cycle lengths. In some cases, non-predictable clock generator 132 may be a clock generator separate from the main processor clock for HMD 112. In some cases, non-predictable clock generator 132 may be a configurable clock generator having a fixed mode and a non-predictable mode, where fixed mode produces an output waveform having cycles of default or near-constant (i.e., within the normal oscillator jitter tolerances) lengths while non-predictable mode produces an output waveform having cycles of randomized lengths. Non-predictable clock generator 132 may be even further configurable to, when in non-predictable mode, produce an output waveform having a uniform randomized length or to produce an output waveform where different portions of the output waveform have different randomized lengths. HMD 112 may specify the mode for the non-predictable clock generator 132 for different operations. For example, HMD 112 may signal the non-predictable clock generator 132 into non-predictable mode for a secure boot sequence of HMD 112 (or a component thereof).

Non-predictable clock generator 132 uses random numbers to generate an output clock waveform having one or more clock cycles with randomized lengths. The output clock waveform is input as the computing clock for a central processing unit (CPU) or other processing circuitry of HMD 112 that executes instructions according to clock cycles of an oscillating signal. While the output clock waveform may define a single randomized length for every clock cycle of the processing circuitry during a boot sequence, non-predictable clock generator 132 may modify the lengths for the output clock waveform cycles over time, such as throughout a secure boot sequence. As such, a clock cycle of the output clock waveform may have a different length than an immediately subsequent clock cycle of the output clock waveform. The length of a clock cycle of a processor clock is the time it takes for the processor clock signal to oscillate a full oscillation. In addition, the difference in length due to modification is greater than the normal jitter of the processor clock caused by, e.g., environmental conditions. In some cases, each clock cycle may be varied. In this way, non-predictable clock generator 132 may increase the randomness of the timing of the boot sequence operations, thereby increasing the trustworthiness of HMD 112 by frustrating replay attacks and/or other attacks on HMD 112. Non-predictable clock generator 132 may produce the output clock waveform having randomized clock cycle lengths in response to receiving an indication of an upcoming secure boot sequence for HMD 112 or a component thereof.

While shown in FIG. 1A and described above as being included in HMD 112, non-predictable clock generator 132 may be included in console 106 in some examples. In these examples, console 106 may invoke non-predictable clock generator 132 when console 106 receives in indication to execute a boot command for one or more components of console 106. In such examples, non-predictable clock generator 132 may then randomize the lengths of clock cycles for processing circuitry implemented in console 106 during a boot sequence of console 106 or components thereof. In other examples, a non-predictable clock generator 132 may be included in a peripheral device, such as a smartphone, tablet computer, personal data assistant (PDA), or other hand-held device that provides processing for HMD 112. The non-predictable clock generator 132 may randomize the lengths of clock cycles for processing circuitry implemented in the peripheral device during a boot sequence of the peripheral device. In some examples, peripheral device may be a smartwatch, smartring, or other wearable device. The peripheral device may also be part of kiosk or other stationary or mobile system. The peripheral device may be in communication with HMD 112, in any form factor included herein, and/or console 106 using one or more wired or wireless communications links (e.g., Wi-Fi, near-field communication of short-range wireless communication such as Bluetooth).

Figure 1B:
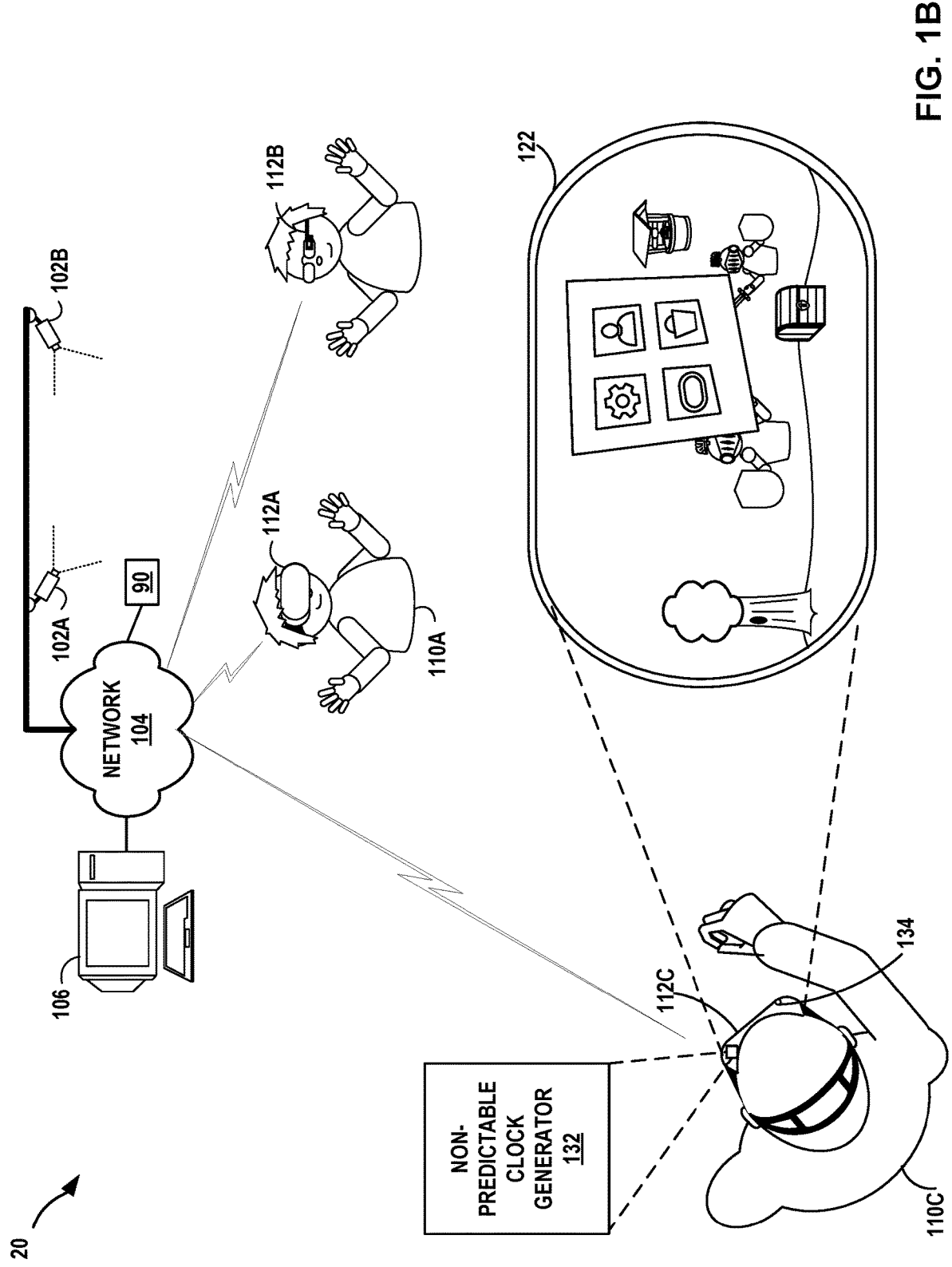
FIG. 1B is an illustration depicting another example artificial reality system that implements a boot sequence with randomized clock cycle lengths in accordance with aspects of this disclosure.

FIG. 1B is an illustration depicting another example artificial reality system 20 that implements a boot sequence with randomized clock cycle lengths in accordance with aspects of this disclosure. Similar to artificial reality system 10 of FIG. 1A, non-predictable clock generator 132 of FIG. 1B generates an output clock waveform with randomized clock cycle lengths to increase the resistance of the system to various attacks that are designed to access and/or manipulate sensitive data, e.g., during the boot sequence of system 20.

In the example of FIG. 1B, artificial reality system 20 includes external cameras 102A and 102B (collectively, "external cameras 102"), HMDs 112A-112C (collectively, "HMDs 112"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user 110. That is, in this example, the artificial reality application constructs artificial content by tracking and computing pose information for a frame of reference for each of HMDs 112. Artificial reality system 20 uses data received from cameras 102 and HMDs 112 to capture 3D information within the real-world environment, such as motion by users 110 and/or tracking information with respect to users 110, for use in computing updated pose information for a corresponding frame of reference of HMDs 112.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A. HMD 112A may also operate substantially similar to HMD 112 of FIG. 1A and receive user inputs by tracking movements of hands 132A, 132B of user 110A. HMD 112B may operate similarly.

While shown in FIG. 1B and described above as being included in HMD 112C, non-predictable clock generator 132 may be included in console 106 in some examples. In these examples, console 106 invokes non-predictable clock generator 132 to perform randomization of clock cycle lengths described herein. A content provider may implement randomization techniques of this disclosure that are generally reciprocal to the randomization of clock cycle lengths described above with respect to non-predictable clock generator 132.

Figure 2A:
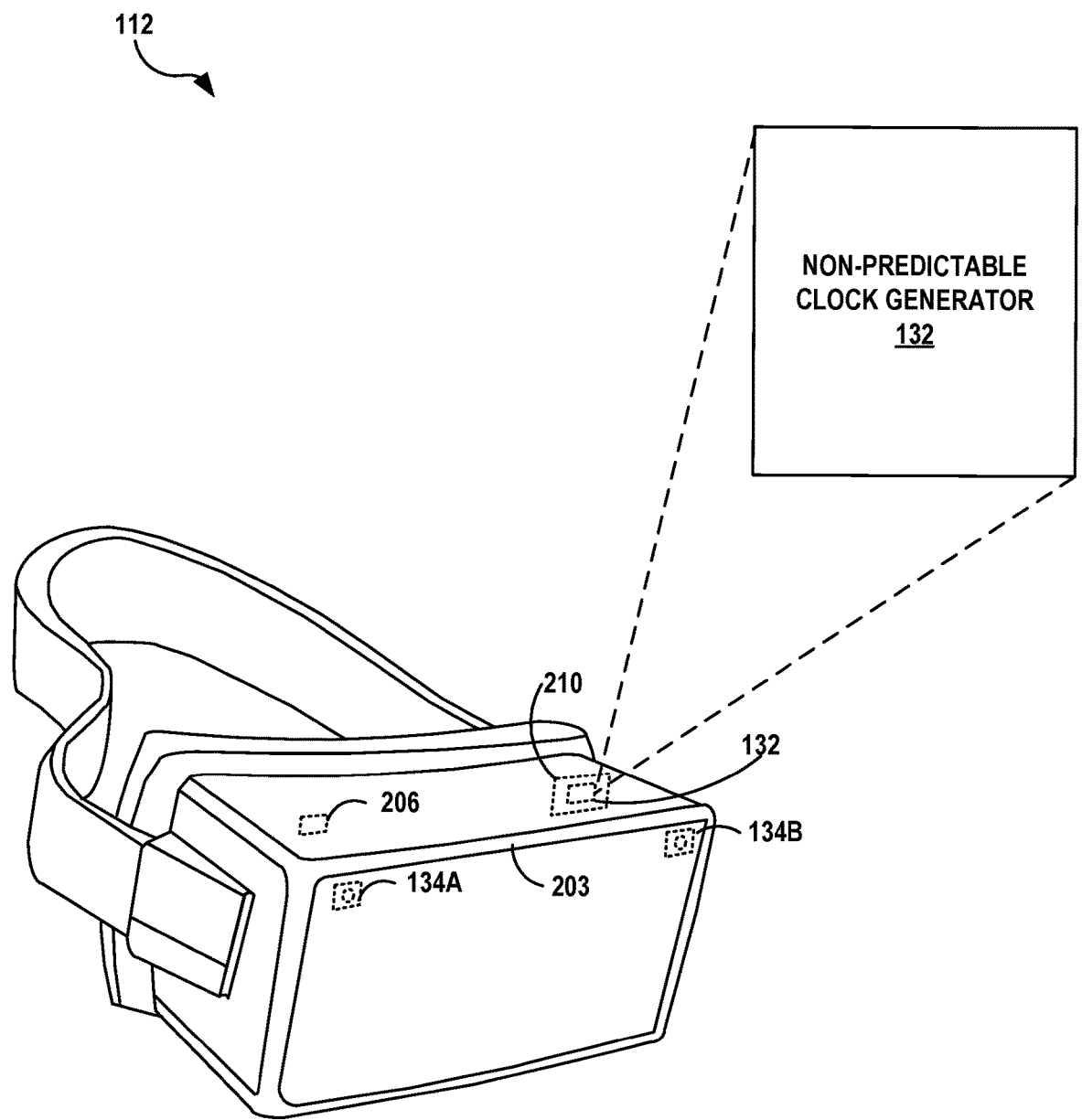
FIG. 2A is an illustration depicting an example HMD configured to randomize clock cycle lengths during a boot sequence in accordance with the techniques of the disclosure.

FIG. 2A is an illustration depicting an example HMD configured to randomize clock cycle lengths during a boot sequence in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. In the example of FIG. 2A, HMD 112 takes the general form factor of a headset.

In this example, HMD 112 includes a front rigid body and a band to secure HMD 112 to a user. In addition, HMD 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar, or sonar that output data indicative of distances of HMD 112 from various objects, or other sensors that provide indications of a location or orientation of HMD 112 or other objects within a physical environment. Moreover, HMD 112 may include integrated image capture devices 134A and 134B (collectively, "image capture devices 134"), such as video cameras, laser scanners, Doppler® radar scanners, depth scanners, or the like, configured to output image data representative of the physical environment.

Figure 2B:
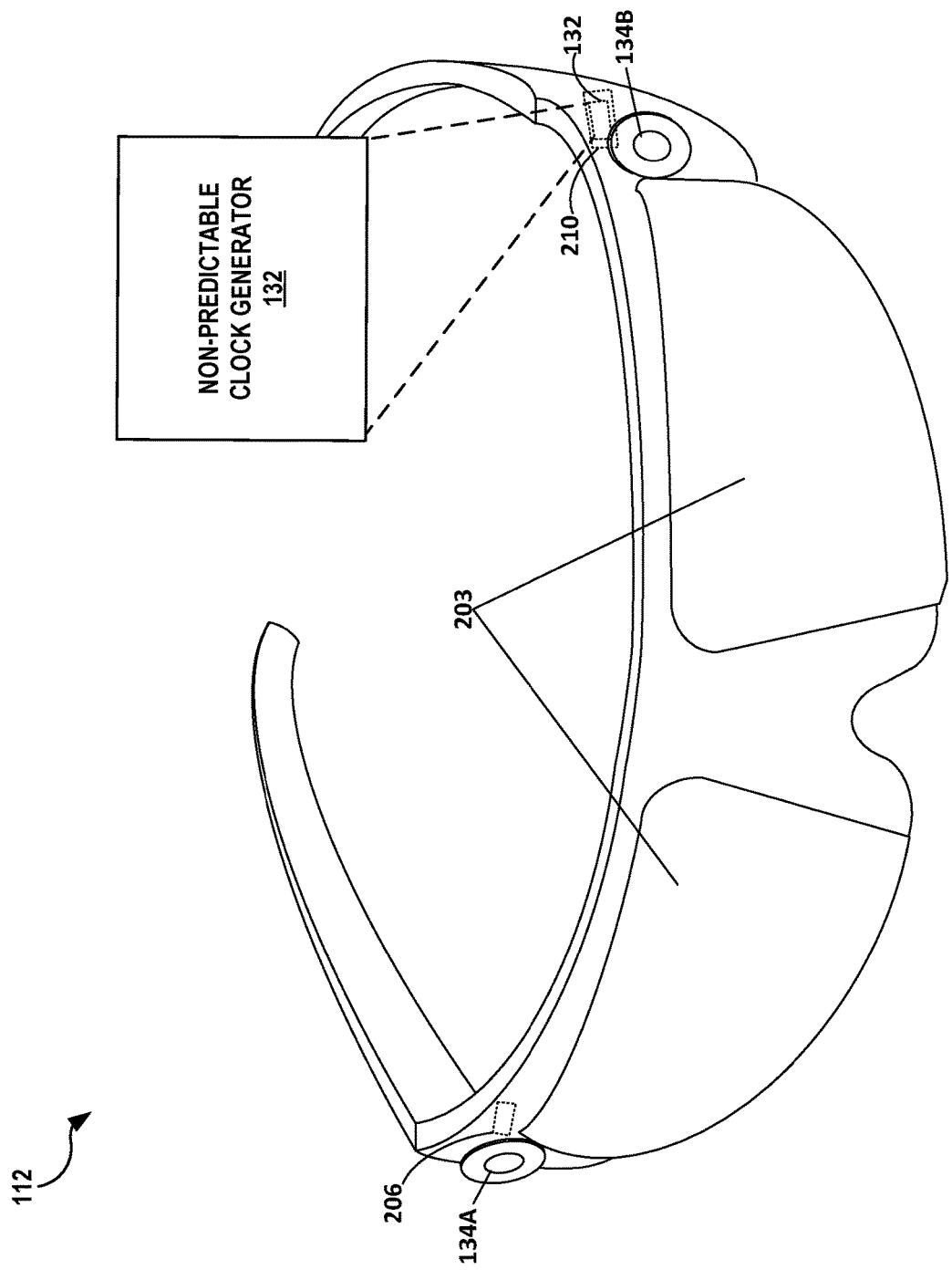
FIG. 2B is an illustration depicting another example of an HMD configured to randomize clock cycle lengths during a boot sequence in accordance with the techniques of the disclosure.

FIG. 2B is an illustration depicting another example of an HMD configured to randomize clock cycle lengths during a boot sequence in accordance with the techniques of the disclosure. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 112 takes the general form factor of glasses.

In this example, HMD 112 includes a front rigid body and two stems to secure HMD 112 to a user, e.g., by resting over the user's ears. In addition, HMD 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

Electronic display 203 may be split into multiple segments, such as into two segments, each segment corresponding to a separate lens disposed on the rigid front body of HMD 112 in the example of FIG. 2B. In other examples, electronic display 203 may form a contiguous surface that spans both lenses and the lens-connecting bridge (i.e., the over-the-nose portion) of the rigid front body of HMD 112 in the example of FIG. 2B. In some examples, electronic display 203 may also encompass portions of HMD 112 that connect the lenses of the front rigid body to the stems, or optionally, portions of the stems themselves, in the example form factor illustrated in FIG. 2B. These various designs of electronic display 203 in the context of the form factor of HMD 112 shown in FIG. 2B improve accessibility for users having different visual capabilities, eye movement idiosyncrasies, etc. Elements of FIG. 2B that share reference numerals with elements of FIG. 2A perform like-functionalities, and are not described separately with respect to FIG. 2B for the sake of brevity.

In the examples illustrated in FIGS. 2A & 2B, control unit 210 of HMD 112 includes non-predictable clock generator 132 illustrated in FIGS. 1A & 1B. Control unit 210 may, for example, comprise any combination of one or more processors, one or more field programmable gate arrays (FPGAs), one or more application specific integrated circuits (ASICs), and one or more application specific standard products (ASSPs). Control unit 210 may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to control non-predictable clock generator 132 (e.g., by controlling timing or other operational parameters) to perform the clock cycle length randomization techniques described in this disclosure. Thus, control unit 210 may represent hardware or a combination of hardware and software to support the below described components (e.g., non-predictable clock generator 132), modules, elements, or operations.

Figure 2C:
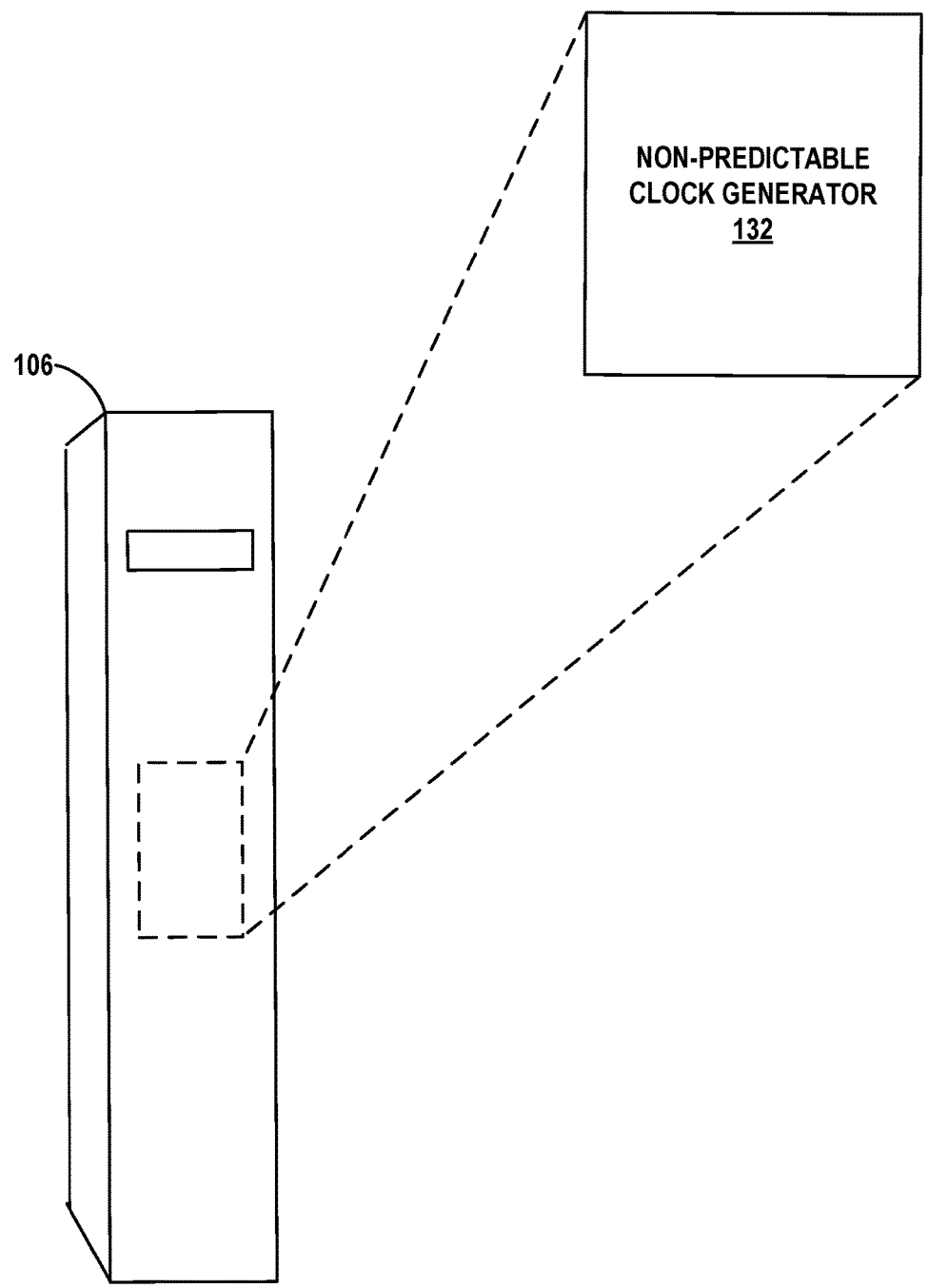
FIG. 2C is an illustration depicting an example of a console configured to randomize clock cycle lengths during a boot sequence in accordance with the techniques of the disclosure.

FIG. 2C is an illustration depicting an example of a console configured to randomize clock cycle lengths during a boot sequence in accordance with the techniques of the disclosure. In the example illustrated in FIG. 2C, non-predictable clock generator 132 is part of console 106, instead of being implemented in HMD 112 as in the examples of FIGS. 2A & 2B. Non-predictable clock generator 132 may implement the clock cycle length randomization operations described above with respect to FIGS. 2A & 2B, but in the context of console 106, in the example of FIG. 2C. As such, whether implemented within HMD 112 or within console 106 that provides decrypted content to HMD 112 or within another console, computing device, or peripheral device, non-predictable clock generator 132 may implement the clock cycle length randomization operations of this disclosure to increase the randomization of the timing of instruction execution, such as a boot sequence for whichever device includes non-predictable clock generator 132. In this way, non-predictable clock generator 132 implements the techniques of this disclosure to, for instance, improve data security in a variety of configurations with which artificial reality systems 10 and 20 are compatible.

In the examples of FIGS. 2A-2C, as described above with respect to FIGS. 1A & 1B, non-predictable clock generator 132 may be configured in accordance with aspects of this disclosure to use a random number generator to affect the lengths of clock cycles in a clock waveform that drives the timing of operations performed by processing circuitry of HMD 112 of FIGS. 2A and 2B or console 106 of FIG. 2C. These techniques may be applied to reduce a likelihood of a successful compromise of secure boot sequences being executed by computing systems, including AR/VR computing systems, among other applications to improve the security of computing systems and of encryption operations generally.

A non-predictable clock generator 132 may be applied to drive operations within a co-processor or peripheral device for an HMD 112, other artificial reality system, or other computing system. The co-processor or peripheral device may include an encryption engine having application-specific or other specialized logic for encryption operations. The co-processor or peripheral device may include a System-on-Chip (SoC) having an integrated hardware environment that executes an operating system and applications and include an instance of non-predictable clock generator 132.

Figure 3:
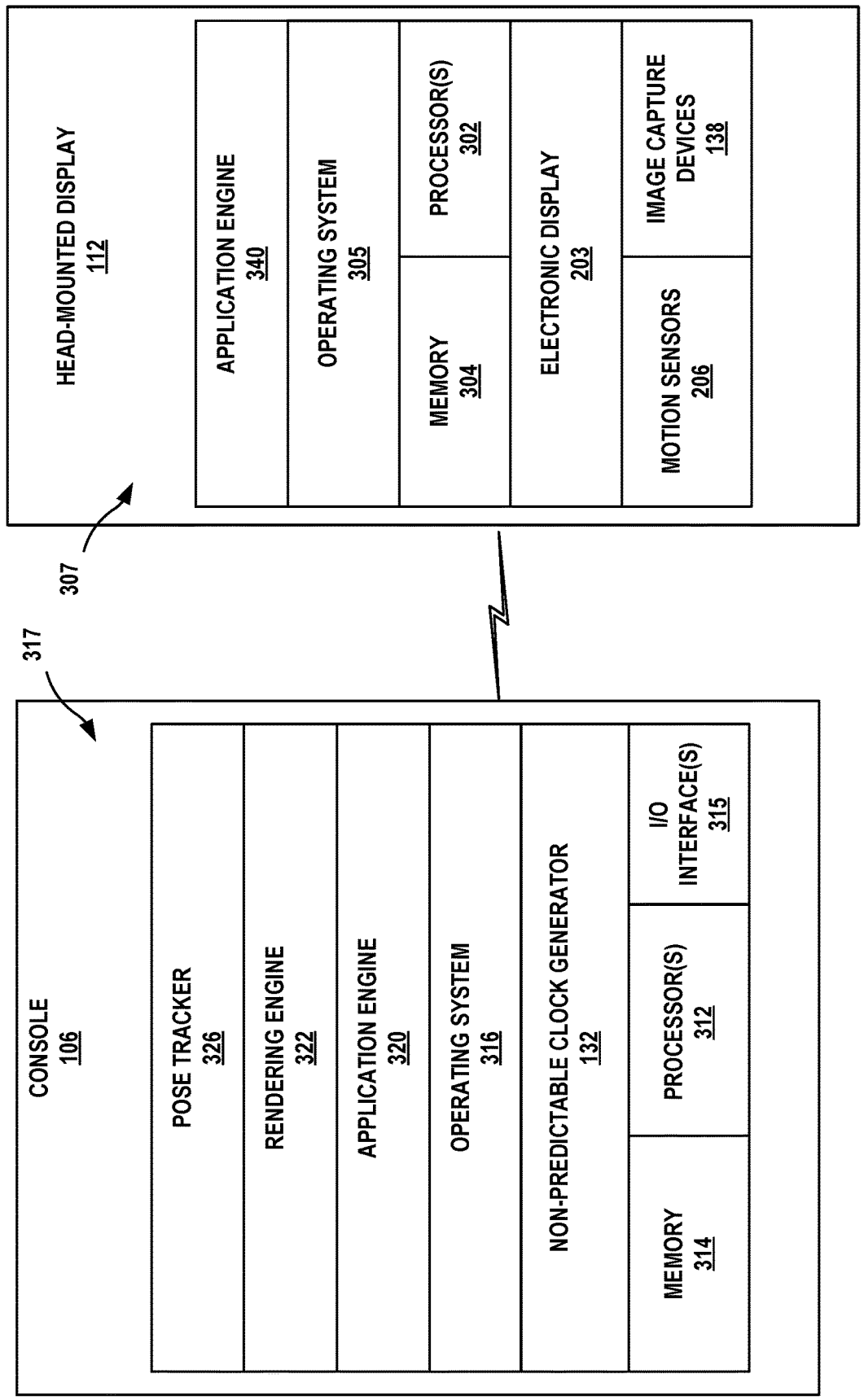
FIG. 3 is a block diagram showing example implementations of a console and an HMD of the artificial reality systems of FIGS. 1A & 1B.

FIG. 3 is a block diagram showing example implementations of a console and an HMD of the artificial reality systems of FIGS. 1A & 1B. In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A & 2B, processors 302 are coupled to electronic display 203, motion sensors 206 and image capture devices 134. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform motion detection, user interface generation, and various other artificial reality-related functionalities for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, WiFi®, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, and pose tracker 326. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (shown in FIGS. 1A & 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

In the example of FIG. 3, console 106 includes non-predictable clock generator 132, which is described above with respect to FIGS. 1A-2B. For example, console 106 may receive an indication of a boot command. Non-predictable clock generator 132 may generate, using one or more random binary sequences generated by a random number generator, an output clock waveform having one or more clock cycles of randomized lengths. Processors 312 may then execute instructions according to the output clock waveform.

While defined as randomized, the output waveform may have the lengths of the one or more clock cycles with randomized lengths be bound by hardware constraints of processor 312. For instance, if processor 312 is a 2 gigahertz (GHz) processor, then non-predictable clock generator 132 may bound the randomized adjustments to the clock cycle lengths such that the clock cycle length is not less than 0.5 nanoseconds (ns). Processor 312 may execute a boot sequence for operating system 316 of console 106 or other software operations using the output waveform generated by the clock randomization techniques described herein.

In one example implementation, a pseudo-random number generator (PRNG) may repeatedly output random binary sequences that are applied by non-predictable clock generator 132 to a clock waveform generated by a clock device to vary the length of clock cycles within the clock waveform to produce an output waveform. These clock waveforms may be produced by any of a number of devices, including a ring oscillator, an external oscillator, or a phase-locked loop (PLL). The clock waveform may have a fixed length clock cycle throughout the waveform. Non-predictable clock generator 132 may apply different random binary sequences to one or more clock cycles of the clock waveform to cause the one or more clock cycles in the output waveform to vary in length. To apply a random binary sequence, non-predictable clock generator 132 may frequency divide the frequency of different portions of the clock waveform by a value that is based on the random binary sequence to generate a corresponding portion of the output waveform, for instance. In general, a frequency divider takes an input signal of a frequency, $f_{in}$, and generates an output signal of a frequency $f_{out}=f_{in}/n$, wherein n is an integer.

As in this example implementation, to increase the non-determinism of the random binary sequences, the PRNG of non-predictable clock generator 132 is optionally seeded with seed information from a true random number generator (TRNG). The TRNG may be a local component to non-predictable clock generator 132 or a remote service, for instance. This seeding may occur at the start of each secure boot sequence or periodically, for instance.

In any of these examples, non-predictable clock generator 132 may alter the clock waveform such that the entirety of the output waveform has a uniform, albeit randomized, clock cycle length throughout the output waveform. In other instances, non-predictable clock generator 132 may alter different portions of the clock waveform with different parts of the random binary sequence such that different portions of the output waveform have different randomized lengths.

Figure 4:
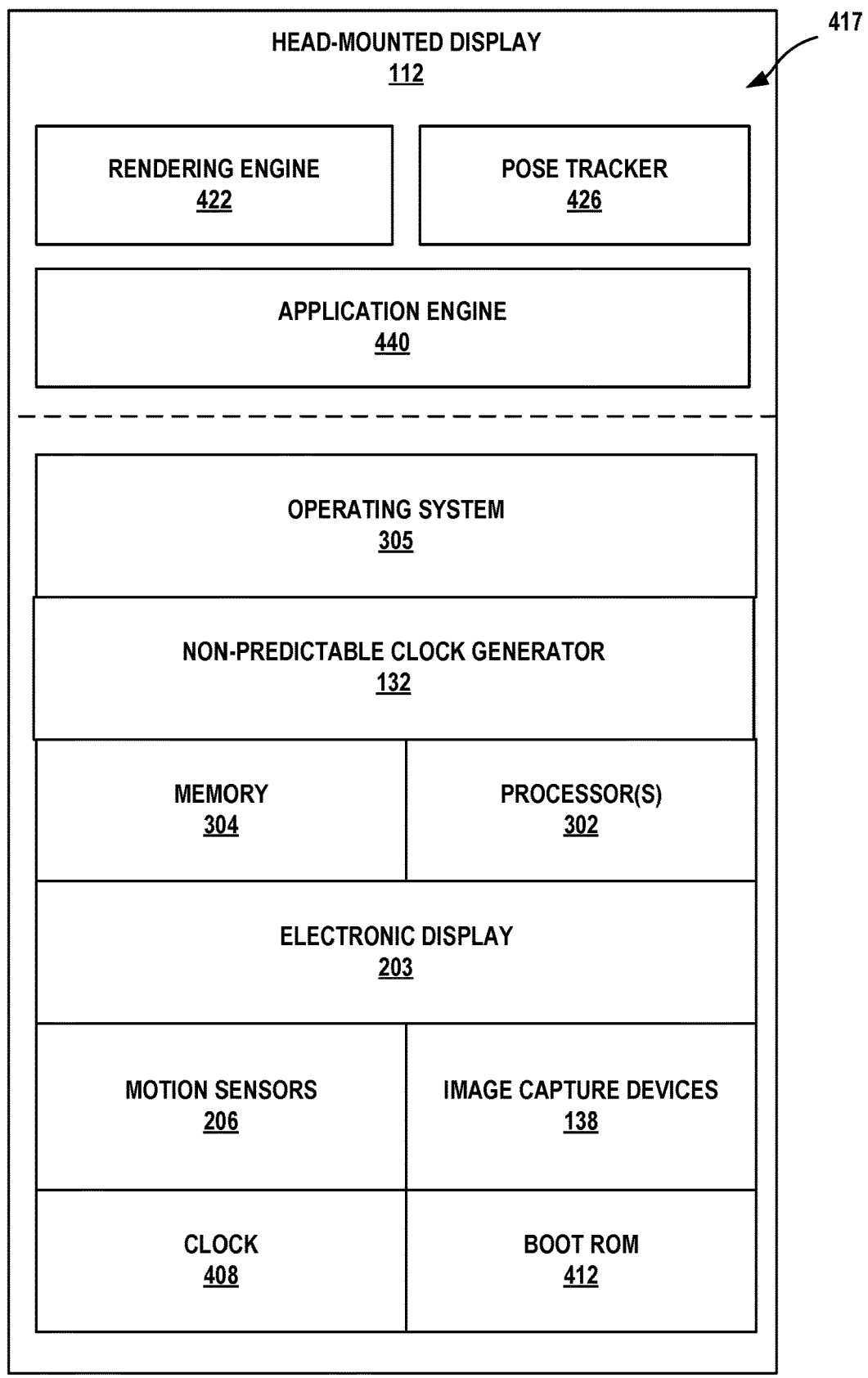
FIG. 4 is a block diagram depicting an example implementation of an HMD of the artificial reality systems of FIGS. 1A & 1B.

FIG. 4 is a block diagram depicting an example implementation of an HMD of the artificial reality systems of FIGS. 1A & 1B. In this example, as in the example of FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 134. Operating system 305 may boot, at least in part, from boot ROM 412.

In the example of FIG. 4, software components 417 operate to provide an overall artificial reality application. In this example, software applications 417 include application engine 440, rendering engine 422, and pose tracker 426. In various examples, software components 417 operate similar to the counterpart components of console 106 of FIG. 3 (e.g., application engine 320, rendering engine 322, and pose tracker 326) to construct the artificial content for display to user 110. In some examples, rendering engine 422 constructs the 3D, artificial reality content which may be overlaid, at least in part, upon the real-world, physical environment of user 110.

In the example of FIG. 4, HMD 112 includes non-predictable clock generator 132, which is described above with respect to FIGS. 1A-3 and generates, using one or more random binary sequences generated by a random number generator, an output clock waveform having one or more clock cycles of randomized lengths. Processors 302 may then execute the boot sequence by executing instructions according to the output clock waveform generated by the non-predictable clock generator 132, which may increase the resilience of HMD 112 to attack.

While defined as randomized, the output waveform may have the lengths of the one or more clock cycles with randomized lengths be bound by hardware constraints of processors 302. For instance, if processors 302 includes an 8 gigahertz (GHz) processor, then non-predictable clock generator 132 may bound the randomized adjustments to the clock cycle lengths such that the clock cycle length is not less than 0.125 nanoseconds (ns). Processor 312 may execute boot ROM 412 for operating system 305 of HMD 112 or other software operations using the output waveform generated by the clock randomization techniques described herein.

In one example implementation, a pseudo-random number generator (PRNG) may repeatedly output random binary sequences that are applied by non-predictable clock generator 132 to a clock waveform generated by a clock device to vary the length of clock cycles within the clock waveform to produce an output waveform. These clock waveforms may be produced by any of a number of devices, including a ring oscillator, an external oscillator, or a phase-locked loop (PLL). The clock waveform may have a fixed length clock cycle throughout the waveform. Non-predictable clock generator 132 may apply different random binary sequences to one or more clock cycles of the clock waveform to cause the one or more clock cycles in the output waveform to vary in length. To apply a random binary sequence, non-predictable clock generator 132 may frequency divide the frequency of different portions of the clock waveform by a value that is based on the random binary sequence to generate a corresponding portion of the output waveform, for instance. In general, a frequency divider takes an input signal of a frequency, $f_{in}$, and generates an output signal of a frequency $f_{out}=f_{in}/n$, wherein n is an integer.

As in this example implementation, to increase the non-determinism of the random binary sequences, the PRNG of non-predictable clock generator 132 is optionally seeded with seed information from a true random number generator (TRNG). The TRNG may be a local component to non-predictable clock generator 132 or a remote service, for instance. This seeding may occur at the start of each secure boot sequence or periodically, for instance.

In any of these examples, non-predictable clock generator 132 may alter the clock waveform such that the entirety of the output waveform has a uniform, albeit randomized, clock cycle length throughout the output waveform. In other instances, non-predictable clock generator 132 may alter different portions of the clock waveform with different parts of the random binary sequence such that different portions of the output waveform have different randomized lengths.

Figure 5:
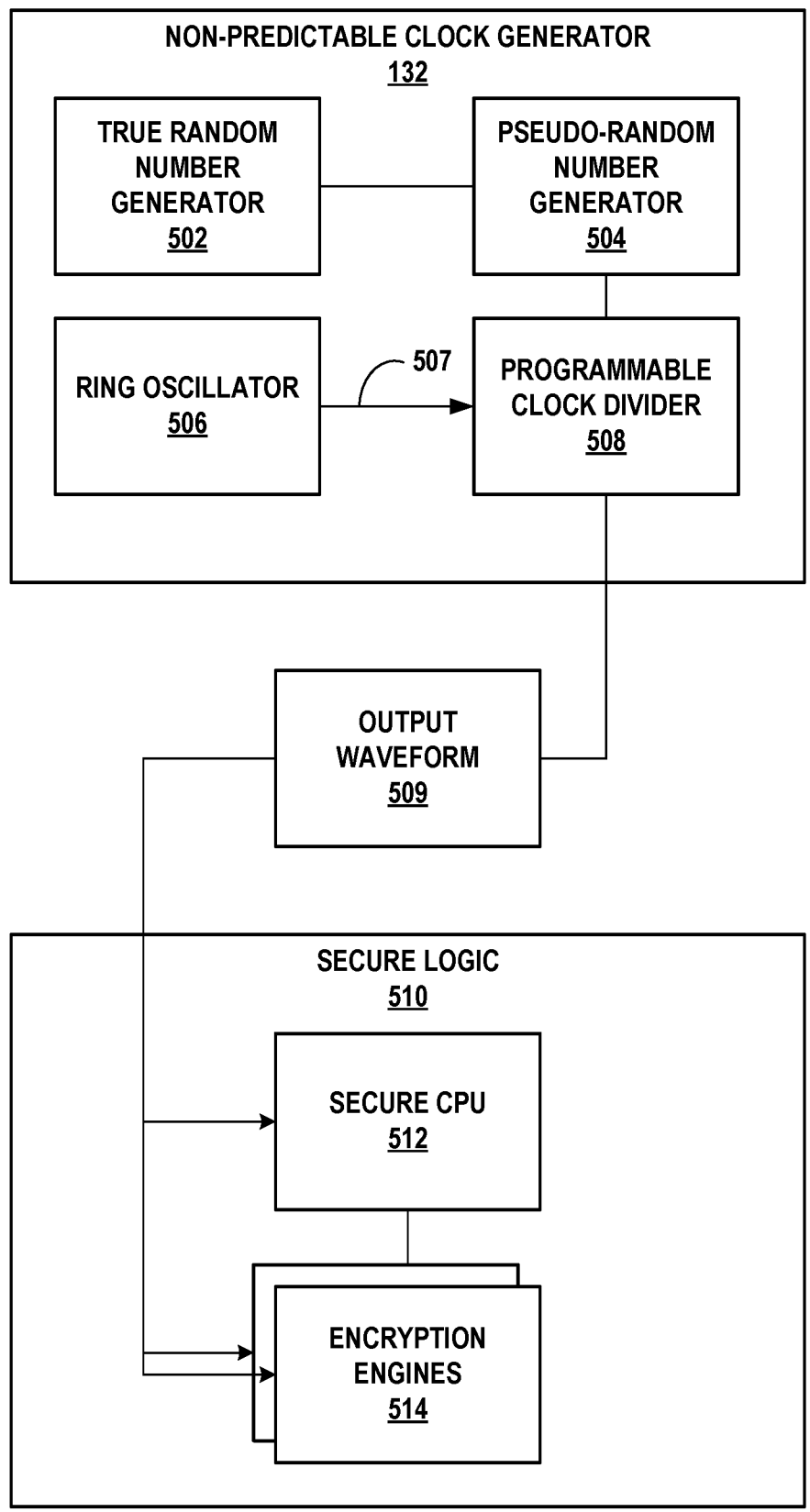
FIG. 5 is a conceptual diagram illustrating an example of a non-predictable clock generator that randomizes lengths of clock cycles for a clock that controls a central processing unit in accordance with the techniques of the disclosure.

FIG. 5 is a conceptual diagram illustrating an example implementation of a non-predictable clock generator 132 that randomizes one or more lengths of clock cycles for a output waveform 509, in accordance with the techniques of the disclosure. Output waveform 509 is shown as an input clock waveform for secure logic 510, which includes processing logic in the form of secure CPU 512 and encryption engines 514. These techniques may be applied to reduce a likelihood of a successful compromise of the secure logic 510, such as during secure boot sequence, where non-predictable clock generator 132 and secure logic 510 may be included in AR/VR computing systems, among other applications, to improve the security of computing systems and of encryption operations generally.

In the example of FIG. 5, non-predictable clock generator 132 may obtain a random number as one or more random binary sequences generated using true random number generator (TRNG) 502 and generate, based at least in part on the random number, output waveform 509 having one or more clock cycles of randomized lengths. TRNG 502 may be a local component or a remote service, for instance. While defined as randomized, output waveform 509 may have the lengths of the one or more clock cycles with randomized lengths be bound by hardware constraints of secure CPU 512. For instance, if secure CPU 512 is a 4 gigahertz (GHz) processor, then non-predictable clock generator 132 may bound the randomized adjustments to the clock cycle lengths such that the clock cycle length is not less than 0.25 nanoseconds (ns). Non-predictable clock generator 132 may also determine whether any artificial limits are placed on secure CPU 512 in the system's basic input/output system (BIOS), such as an underclocking or overclocking limit different from the manufacturer's recommended settings. If such an artificial limit exists in the system BIOS, non-predictable clock generator 132 may use the artificial limit in determining the bounds for the randomized clock cycle lengths.

Secure logic 510 includes one or more of secure CPU 512 and encryption engines 514. Secure CPU 512 may execute a boot sequence for an operating system of the device that includes secure CPU 512 or other software operations using the output waveform 509. Secure logic 510 may be part of a secure boot component for a computing system. Encryption engines 514 encrypt and decrypt data.

In this example implementation, pseudo-random number generator (PRNG) 504 repeatedly outputs random binary sequences that are applied by programmable clock divider 508 to a clock waveform 507, generated by ring oscillator 506, to vary the length of clock cycles within the clock waveform 507 to produce output waveform 509. Clock waveform 507 may have a fixed length clock cycle throughout the waveform. Programmable clock divider 508 may apply different random binary sequences to one or more clock cycles of clock waveform 507 to cause the one or more clock cycles in the output waveform 509 to vary in length. To apply a random binary sequence, programmable clock divider 508 may frequency divide the frequency of different portions of clock waveform 507 by a value that is based on the random binary sequence to generate a corresponding portion of output waveform 509, for instance. In general, a frequency divider takes an input signal of a frequency, $f_{in}$, and generates an output signal of a frequency $f_{out}=f_{in}/n$, wherein n is an integer.

As in this example implementation, to increase the non-determinism of the random binary sequences, PRNG 504 is optionally seeded with seed information from a true random number generator (TRNG). TRNG 502 may be a local component or a remote service, for instance. This seeding may occur at the start of each secure boot sequence or periodically, for instance. For example, a computing device may request seed information from a TRNG service and use the seed information to seed the PRNG 504.

To further increase the randomness of the output clock waveform from the random clock generator, a ring oscillator 506 may generate the clock waveform 507 that is modified using the random binary sequences from PRNG 504. An external oscillator or phase-locked loop (PLL), for example, may alternatively be used to generate the clock waveform 507. In any of these examples, non-predictable clock generator 132 may alter clock waveform 507 such that the entirety of output waveform 509 has a uniform randomized clock cycle length throughout output waveform 509. In other instances, non-predictable clock generator 132 may alter different portions of clock waveform 507 with different parts of the random binary sequence such that different portions of output waveform 509 have different randomized lengths.

The predictable nature of boot sequences makes computing systems vulnerable to malicious attacks, such as replay attacks, channel analysis, reset glitching, and laser pulsing when executing the boot sequences. In particular, replay attacks during the boot sequence rely on the predictability of the boot sequence process and clock timing during the boot sequence, enabling attackers to inject packets into the boot sequence at different times, representing different steps in the boot sequence, to instigate some sort of desired response. However, for replay attacks to be successful, the injections must occur at very specific times, or else the desired response will not be produced.

The output clock waveform generated by non-predictable clock generator 132 may be used to frustrate replay attacks or other attacks on a computing system and thereby increase the trustworthiness of the computing system. A replay attack exploits the predictable timing of operations executed by a computing device, such as during a secure boot sequence. By driving the timing of the operations using a clock waveform having randomly-generated cycle lengths, the timing of operations is no longer predictable and this reduces the likelihood that a replay attack will succeed. The output clock waveform as generated herein may also frustrate other types of attacks, such as channel analysis, reset glitching, laser pulsing, and so forth.

When a chip having logic driven by an output waveform from non-predictable clock generator 132 boots, each operation performed by the chip now occurs at a time that is no longer predictable, which brings at least two benefits. First, the number of repetitions that the attacker must run increases by orders of magnitude, because the knowledge that the attack failed at a certain point in time does not give any additional information. In other words, the next time the sequence restarts, the chip will be doing a completely different operation at the same point in time. The variability increases as the length of the operation that needs to be protected increases. Second, even if the attacker were to be able to execute the attack successfully once, the attacker would not be able to replay the attack because the attacker would not be able to predict when the same operation will happen at the next execution.

The randomized clock cycle length techniques described herein may present advantages over other techniques for modifying clock cycle lengths. For example, spread spectrum clocking techniques modulate the clock frequency to address electromagnetic interference. However, spread spectrum clock frequency modulation may still leave the system vulnerable to attack during the secure boot sequence. The techniques described herein, in contrast to spread spectrum clocking, offer a technical improvement of randomizing the clock cycle lengths using a random number generator that, at least in some cases, does not output values that conform to a known distribution and are therefore more truly random. In some cases, because the techniques rely on clock division, the time taken to perform the boot sequence may be increased, but this increase provides the practical application of improving the overall security of the boot sequence.

Figure 6A:
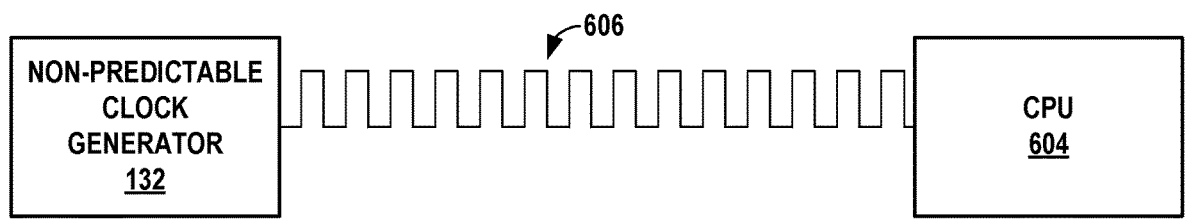
FIGS. 6A and 6B are conceptual diagrams of example output waveforms that have randomized clock cycle lengths in accordance with the techniques of the disclosure.
Figure 6B:
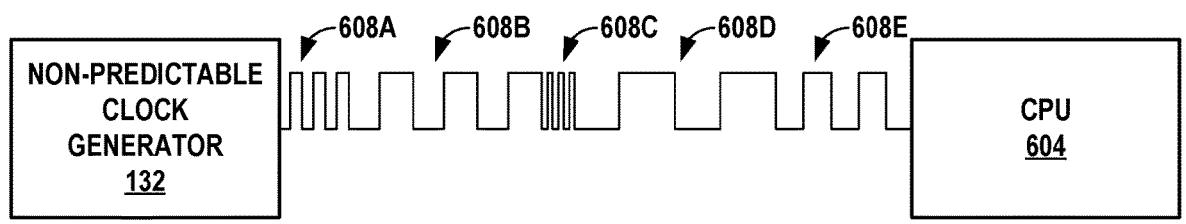

FIGS. 6A and 6B are conceptual diagrams of example output waveforms that have randomized clock cycle lengths in accordance with the techniques of the disclosure. In the examples of FIGS. 6A and 6B, non-predictable clock generator 132 may be similar to non-predictable clock generator 132 as described in any of FIGS. 1A-5, and may perform the clock cycle length randomization described throughout this disclosure. Similarly, central processing unit (CPU) 604 may be similar to processors 302, 312, and 512 of FIGS. 3-5, respectively, and may execute instructions in accordance with an output waveform generated by non-predictable clock generator 132 where the output waveform has one or more randomized frequencies that affect the clock cycle length of CPU 604.

In the examples of FIGS. 6A and 6B, the output waveforms generated by non-predictable clock generator 132 are represented by waveforms 606 and 608A-608E (collectively, waveform 608). Waveforms 606 and 608 drive execution of machine instructions by CPU 604. The machine instructions may form at least part of a sequence of operations (e.g., the boot sequence). For instance, at each initial spike in clock waveforms 606 and 608, upon receipt of that portion of waveforms 606 and 608, CPU 604 may execute the next instruction in the sequence of operations. In instances where CPU 604 may execute multiple instructions in parallel, CPU 604 may execute the next group of instructions at the receipt of each initial spike in clock waveforms 606 and 608.

In the example of FIG. 6A, non-predictable clock generator 132 alters a default clock waveform to produce waveform 606 that has a random, but uniform, frequency throughout the transmission of waveform 606. For instance, initially, a default clock waveform may have a particular clock cycle length, potentially similar to the recommended limit for the particular model of CPU 604. Non-predictable clock generator 132 may use the random binary sequence to alter the default clock waveform to generate output waveform 606. The default clock waveform may be input to non-predictable clock generator 132 or generated by non-predictable clock generator 132. In the example of FIG. 6A, the default clock waveform may have clock cycle lengths of 0.5 ns that cause CPU 604 to execute instructions at a corresponding rate. Non-predictable clock generator 132 may randomly alter the default clock waveform to be output waveform 606, which may have clock cycle lengths of 0.63 ns and cause CPU 604 to execute an instruction at a slower pace than would the default waveform would.

In the example of FIG. 6B, non-predictable clock generator 132 alters different portions of a default clock waveform to produce waveform 608 that has multiple different, random frequencies at different points along waveform 608. For instance, initially, a default clock waveform may have a particular clock cycle length, potentially similar to the recommended limit for the particular model of CPU 604, such as 0.25 ns. Non-predictable clock generator 132 may use the random binary sequence to alter the default clock waveform at different times using different binary sequences to arrive at output waveform 608.

For instance, non-predictable clock generator 132 may use a first segment of the random binary sequence to alter the length of the clock cycles for a first segment of the default clock waveform to produce first segment 608A of output waveform 608. If the minimum clock cycle length of CPU 604, as defined by the manufacturer's recommended clock length, is 0.25 ns, first segment 608A may have a smaller frequency, such as 0.5 ns. Each segment of the random binary sequence may be an n-bit values used by a clock divider to divide the default clock waveform, meaning that each segment may have a length that is some integer multiple of the manufacturer's recommended clock length.

Non-predictable clock generator 132 may repeat this process for a second, third, fourth, and fifth segment of the random binary sequence, altering different segments of the default clock waveform to produce segments 608B, 608C, 608D, and 608E. As such, when CPU 604 is executing instructions in a sequence of operations, such as a boot sequence, the clock cycles of CPU 604 may have different lengths throughout the sequence. For instance, if segment 608A has a clock cycle length of 0.5 ns, segment 608B may increase the timing even further, such as to 0.6 ns. When CPU 604 receives segment 608C of the output waveform, CPU 604 may decrease the time for the clock cycles to 0.25 ns. CPU 604 may then significantly increase the time length for the clock cycles upon receiving segment 608D, such as to 3.75 ns. Finally, CPU 604 may decrease the time length for the clock cycles upon receiving segment 608E, such as to 1 ns. Non-predictable clock generator 132 may apply modifications to the output clock waveform out of step with the frequency of the output clock waveform. Non-predicable clock generator 132 may alter the frequency of output clock waveform periodically or at semi-random times.

The predictable nature of boot sequences makes computing systems vulnerable to malicious attacks, such as replay attacks, channel analysis, reset glitching, and laser pulsing when executing the boot sequences. In particular, replay attacks during the boot sequence rely on the predictability of the boot sequence process and clock timing during the boot sequence, enabling attackers to inject packets into the boot sequence at different times, representing different steps in the boot sequence, to instigate some sort of desired response. However, for replay attacks to be successful, the injections must occur at very specific times, or else the desired response will not be produced.

The output clock waveform generated by non-predictable clock generator 132 may be used to frustrate replay attacks or other attacks on a computing system and thereby increase the trustworthiness of the computing system. A replay attack exploits the predictable timing of operations executed by a computing device, such as during a secure boot sequence. By driving the timing of the operations using a clock waveform having randomly-generated cycle lengths, the timing of operations is no longer predictable and this reduces the likelihood that a replay attack will succeed. The output clock waveform as generated herein may also frustrate other types of attacks, such as channel analysis, reset glitching, laser pulsing, and so forth.

When a chip having logic driven by an output waveform from non-predictable clock generator 132 boots, each operation performed by the chip now occurs at a time that is no longer predictable, which brings at least two benefits. First, the number of repetitions that the attacker must run increases by orders of magnitude, because the knowledge that the attack failed at a certain point in time does not give any additional information. In other words, the next time the sequence restarts, the chip will be doing a completely different operation at the same point in time. The variability increases as the length of the operation that needs to be protected increases. Second, even if the attacker were to be able to execute the attack successfully once, the attacker would not be able to replay the attack because the attacker would not be able to predict when the same operation will happen at the next execution.

Figure 7:
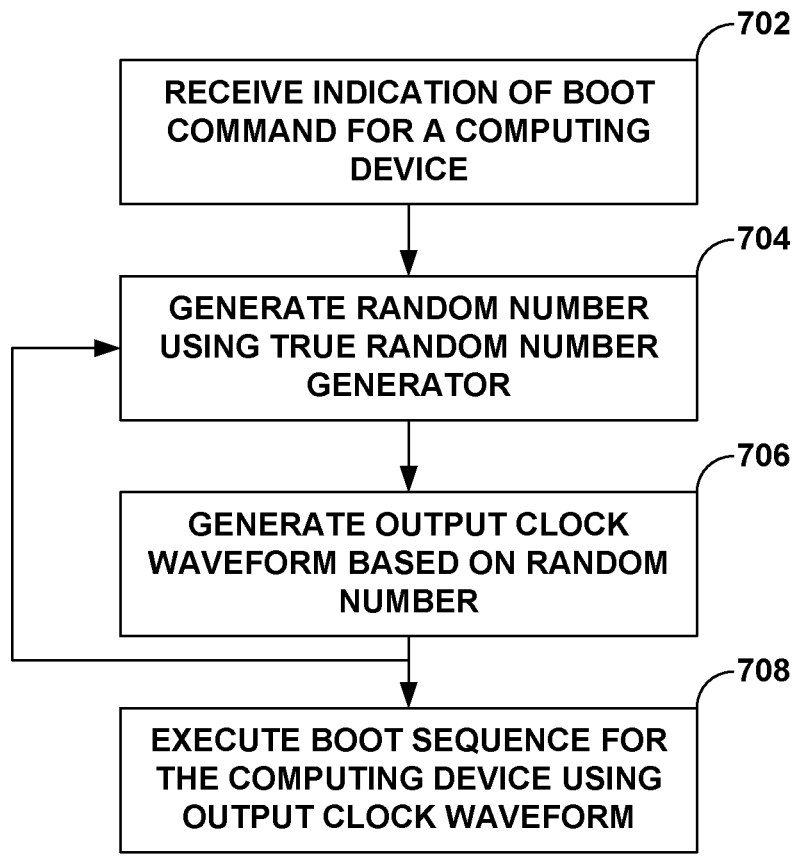
FIG. 7 is a flowchart illustrating an example process by which the artificial reality systems of FIGS. 1A & 1B utilize a non-predictable clock generator of this disclosure to randomize clock cycles for a central processing unit of the system.

FIG. 7 is a flowchart illustrating an example process by which artificial reality systems 10 & 20 utilize non-predictable clock generator 132 to decrypt and render encrypted artificial reality content. The process is described herein as being performed by artificial reality system 10 and components thereof, such as HMD 112 as an example, although it will be appreciated that other systems and components of this disclosure may perform the process as well, in accordance with aspects of this disclosure. According to the process of FIG. 7, non-predictable clock generator 132 receives an indication of a boot command (702). Non-predictable clock generator 132 generates a random number using a true random number generator (704). Non-predictable clock generator 132 generates, based at least in part on the random number, an output clock waveform having at least a length of a clock cycle for a processor of HMD 112 (706). Non-predictable clock generator 132 continues generating the output clock waveform based on the random number (706) until the non-predicable clock generator 132 generators a new random number (704) and generates the output clock waveform based on the new random number (706). The processor of HMD 112 executes a boot sequence for at least a component of HMD 112 using the output clock waveform (708).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A processing circuit to initialize a secure execution environment for a computing device, the processing circuit comprising:
    a non-predictable clock generator having a fixed mode and a non-predictable mode, wherein the fixed mode configures the clock generator to generate an output clock waveform having a fixed length clock cycle and the non-predictable mode configures the clock generator to generate, using one or more random binary sequences generated by a random number generator, an output clock waveform having one or more clock cycles of randomized lengths; and
    processing logic, the processing logic configured to:
        in response to a determination to execute a secure boot sequence for the computing device, signal the clock generator to operate in non-predictable mode; and
        execute instructions of the secure boot sequence according to the output clock waveform generated by the non-predictable clock generator operating in the non-predictable mode to initialize the secure execution environment for the computing device.

2. The processing circuit of claim 1, further comprising:
    an oscillator configured to generate a waveform,
    wherein to generate the output clock waveform having one or more clock cycles of randomized lengths the clock generator is configured to apply the one or more random binary sequences to the waveform.

3. The processing circuit of claim 1, wherein the output waveform having a fixed length clock cycle comprises an output waveform having clock cycles of near constant lengths.

4. The processing circuit of claim 1, further comprising the random number generator, wherein the random number generator comprises:
    a pseudo-random number generator configured to generate the one or more random binary sequences based at least on a seed generated by a true random number generator.

5. The processing circuit of claim 1,
    wherein the processing circuit further comprises a ring oscillator configured to generate a clock waveform, and
    wherein to generate the output clock waveform having one or more clock cycles of randomized lengths the clock generator is configured to apply the one or more random binary sequences to the clock waveform.

6. The processing circuit of claim 5, wherein the clock waveform has a fixed length clock cycle.

7. The processing circuit of claim 1,
    wherein the clock generator is further configured to receive a clock waveform from an external oscillator,
    wherein to generate the output clock waveform having one or more clock cycles of randomized lengths the clock generator is configured to apply the one or more random binary sequences to the clock waveform.

8. The processing circuit of claim 1, wherein the processing circuit further comprises a phase-locked loop configured to generate a clock waveform,
    wherein to generate the output clock waveform having one or more clock cycles of randomized lengths the clock generator is configured to apply the one or more random binary sequences to the clock waveform.

9. The processing circuit of claim 1, wherein the processing circuit is a component of an artificial reality system.

10. The processing circuit of claim 1, wherein the processing circuit is a component of the computing device, wherein the computing device comprises a computing system on a chip.

11. The processing circuit of claim 1, wherein the clock generator is further configured to frustrate one or more of a replay attack, a channel analysis attack, a reset glitching attack, or a laser pulsing attack on the computing device.

12. The processing circuit of claim 1, wherein the clock generator comprises a clock divider configured to frequency divide respective portions of a clock waveform by respective values based on the one or more random binary sequences to generate the output clock waveform having one or more clock cycles of randomized lengths.

13. The processing circuit of claim 1, wherein to generate the output clock waveform having one or more clock cycles of randomized lengths the clock generator is configured:
    for each of the one or more random binary sequences:
        frequency divide a different portion of a clock waveform by a value based on the respective random binary sequence to generate a corresponding portion of the output clock cycle waveform having one or more clock cycles of randomized lengths.

14. A method comprising:
    generating, by a processing circuit comprising a non-predictable clock generator having a fixed mode and a non-predictable mode, when the non-predictable clock generator is in non-predictable mode and using one or more random binary sequences generated by a random number generator, an output clock waveform having one or more clock cycles of randomized lengths;
    generating, by the processing circuit, when the non-predictable clock generator is in fixed mode, an output clock waveform having a fixed length clock cycle;

in response to determining to execute a secure boot sequence for a computing device, signaling, by processing logic of the processing circuit, the clock generator to operate in non-predictable mode; and executing, by the processing logic of the processing circuit, instructions of the secure boot sequence according to the output clock waveform generated by the non-predictable clock generator operating in the non-predictable mode to initialize a secure execution environment for the computing device.

15. The method of claim 14, further comprising:
generating, by the processing circuit and using one or more of an oscillator, a ring oscillator, or a phase-locked loop, a clock waveform, wherein the clock waveform has a fixed length clock cycle; and
applying, by the processing circuit, the one or more random binary sequences to the clock waveform to generate the output clock waveform having one or more clock cycles of randomized lengths.

16. The method of claim 14, further comprising:
generating, by the processing circuit and using a boot controller, the instructions.

17. The method of claim 14, further comprising:
generating, by the processing circuit and using a pseudo-random number generator, the one or more random binary sequences based at least on a seed generated by a true random number generator.

18. The method of claim 14, wherein generating the output clock waveform having one or more clock cycles of randomized lengths comprises:
frequency dividing, by the processing circuit, respective portions of a clock waveform by respective values based on the one or more random binary sequences to generate the output clock waveform having one or more clock cycles of randomized lengths.

19. A computing device comprising:
a non-predictable clock generator having a fixed mode and a non-predictable mode, wherein the fixed mode configures the clock generator to generate an output clock waveform having a fixed length clock cycle and the non-predictable mode configures the clock generator to generate, using one or more random binary sequences generated by a random number generator, an output clock waveform having one or more clock cycles of randomized lengths; and
processing circuitry configured to:
in response to a determination to execute instructions of a secure boot sequence for an operating system of the computing device, signal the clock generator to operate in non-predictable mode; and
execute the instructions according to the output clock waveform generated by the non-predictable clock generator operating in the non-predictable mode to initialize a secure execution environment for the computing device.

20. The computing device of claim 19, further comprising:
a boot loader configured to control loading of the operating system for the computing device in part by:
initiating execution of the secure boot sequence; and
causing the processing circuitry to use the output clock waveform having one or more clock cycles of randomized lengths as a timing waveform for executing instructions.

* * * * *